United States Patent Office 2,801,038
Patented July 30, 1957

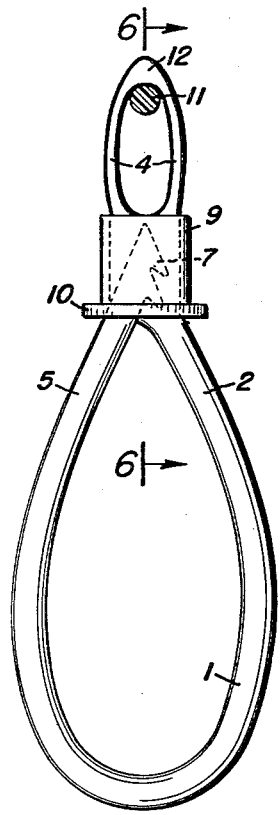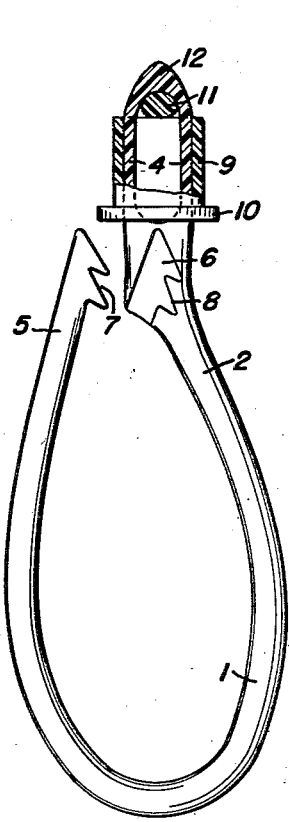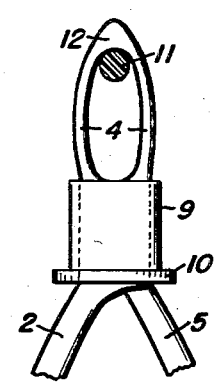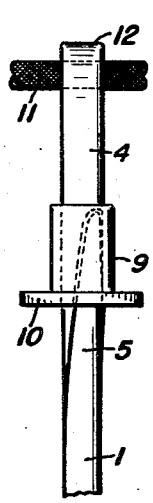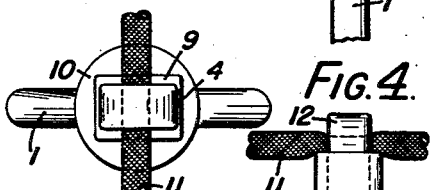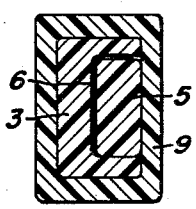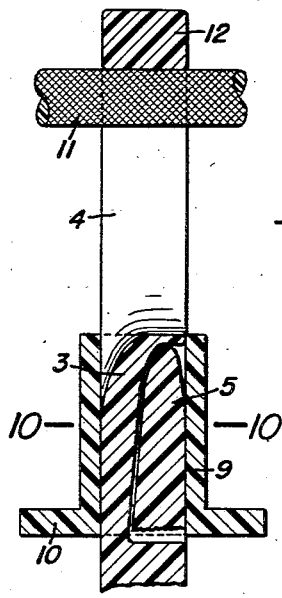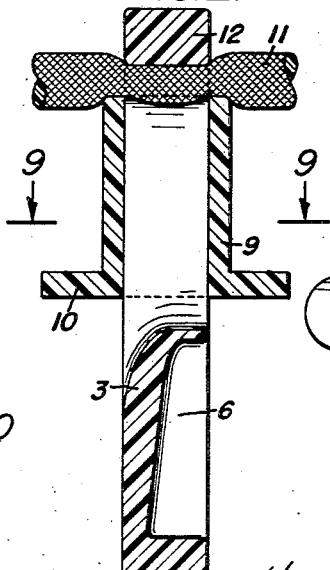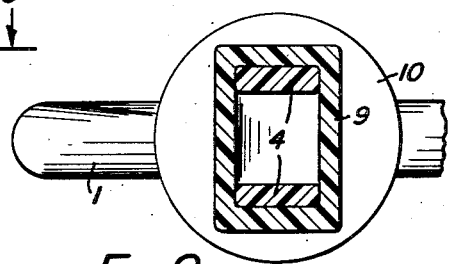

2,801,038

FISH HOLDER FOR STRINGERS

Lewis E. Hamel, Rochester, N. Y., assignor to Lewis E. Hamel Co., Inc., Rochester, N. Y., a corporation of New York Application March 1, 1956, Serial No. 568,864

6 Claims. (Cl. 224—7)

This invention relates to a fish holder for stringers, of the general type in which a multiplicity of holders are mounted upon a common stringer, one end of which is attached to a boat or other support, while the opposite end with fish attached is suspended in the water, and it has for its purpose to afford a structure that overcomes the disadvantages of conventional metal fish holders and is not affected by fresh or salt water.

Fish holders for stringers have generally been manufactured of wire or metal, causing them to rust and deteriorate quickly from being suspended in water, and one of the purposes of the invention is to produce a fish holder from nylon or from a material having similar characteristics, which is not affected by water and is durable, wear resistant, of light weight, and can be economically manufactured.

Another object of the invention is to afford a structure in which a fish is securely and permanently held when once attached to the holder, and in which there is no possible chance of the holder being opened and the fish released either accidentally or by any pressures or tension exerted by a fish while attached to the holder.

An additional purpose of the invention is to provide a holder that is of considerably less weight than a metal holder, and can be readily manipulated to attach or remove a fish.

Still another purpose is to provide a nylon holder in which there is a fish engaging loop having one end formed into a bill and removably held in interlocked relation to the holder by a slidable retaining collar which when in one position securely holds the movable bill locked in the holder in such a manner as to be securely held against accidental displacement, and which can be readily moved when desired to its releasing position.

More specifically, the invention includes a retaining collar that is movable on the holder and held in locking position by convex sides of a stringer engaging loop, the sides of which are slightly movable toward each other when under pressure, to release the slidable collar when the latter is moved over the loop.

Still a further purpose of the invention is to afford a nylon structure with a retaining collar that is slideable over the bill and stringer engaging loop and which is held over the bill of the fish engaging loop when in closed position, or in engagement with a nylon stringer rope extending through the stringer engaging loop when in open position, and thus acting to secure the holder at any desired position on the stringer in readiness to receive a fish.

To these and other ends, the invention consists in the construction and arrangement of parts that will appear more clearly from the following description when read in conjunction with the accompanying drawings, the novel features being pointed out in the claims following the specification.

In the drawings:

Fig. 1 is a view in side elevation of a fish holder constructed in accordance with a preferred embodiment of the invention, showing it attached to a stringer rope, with the bill appearing in closed position, and the retaining collar surrounding the bill;

Fig. 2 is a view similar to Fig. 1, partially broken away, with the retaining collar moved to its outermost position, and the bill in open position;

Fig. 3 is a view similar to Fig. 1, partially broken away, and looking in the direction opposite to Fig. 1;

Fig. 4 is a view in edge elevation, partially broken away, looking from left to right of Fig. 1;

Fig. 5 is a similar view looking in the direction opposite to Fig. 4, and showing the retaining collar in its outermost or open position;

Fig. 6 is an enlarged sectional view taken on line 6—6 of Fig. 1;

Fig. 7 is a similar view with the retaining collar moved to its outermost or open position in which it is engaged with the stringer rope to secure the holder fixed thereon;

Fig. 8 is an end elevation with the parts positioned as in Figs. 1 and 4;

Fig. 9 is a transverse sectional view on line 9—9 of Fig. 7, and

Fig. 10 is a transverse sectional view on line 10—10 of Fig. 6.

Referring more particularly to the drawings in which like reference numerals throughout the several views refer to the same parts, the structure shown which is a preferred embodiment exemplary of the invention, comprises a holder that includes a fish engaging loop indicated generally at 1 and having one end 2, formed integral with a connecting portion 3, which is also integral with a stringer engaging loop that consists of opposite portions or sides 4, which are slightly convexed outwardly as shown, while 5 designates the other end of the fish engaging loop that is free and formed into a pointed bill that is separable from the connecting portion 3 to permit placing a fish on the loop 1 by inserting the bill 5 through the mouth of the fish, as usual in structures for this purpose.

The connecting portion 3 is provided with an opening, preferably in the form of a recess 6 in one face thereof that has an inclined bottom and is shaped to conform to and to receive the pointed bill 5, which is inserted into the recess by moving the bill from approximately the dotted line position shown in Fig. 1 to a position immediately over the recess 6 and then moving the bill crosswise until it enters the recess 6. When the bill is positioned in the recess, its outer surface is preferably flush with the adjacent outer surfaces of the connecting portion, as appears in Fig. 10.

In order to prevent endwise movement of the bill when positioned in the recess, the connecting portion 3 and bill are provided with interengaging or interlocking instrumentalities preferably in the form of teeth 7, formed on the bill and engageable with corresponding pockets 8 provided in the connecting portion. The teeth 7 and pockets 8 are located on adjacent edges of the bill and recess of the connnecting portion, so that when in such position, the bill is securely held by the connecting portion against endwise movement.

In order to maintain the bill against crosswise movement relatively to the connecting portion 3, and to secure the bill against any possibility of accidental displacement or removal by tensions or pressure exerted by a fish held on the loop, there is provided a retaining collar that is slideable endwise of the connecting portion and of the stringer engaging loop.

The connecting portion 3 is preferably of rectangular cross section and the retaining collar, which is designated at 9, has an interior rectangular cross section that is but slightly greater than the cross section of the connecting portion 3, so that the collar is frictionally engaged with the connecting portion 3 and can slide thereon when endwise pressure is applied.

The entire structure including the loops, connecting portion and retaining collar, are made of nylon suitably molded, as this material is unaffected by salt or fresh water and will wear indefinitely without rusting or otherwise deteriorating from effects of moisture and use, and nylon also affords the desired frictional engagement between the retaining collar and the nylon loop and connecting portion over which it slides. The results attained with the invention are due mainly to the use of nylon which is believed essential in the proper functioning and utility of the invention, since it has the required characteristics of flexibility, wear, non-rust, and necessary yieldability.

The interior cross section of the retaining collar 9 is of slightly less width than the normal width of the stringer engaging loop, or the normal distance between the outer surfaces of the opposite convex sides 4, such greater width of the convex surfaces of the sides of the stringer engaging loop being sufficient to hold the retaining collar 9 in its closed innermost position as indicated in Fig. 1 where it surrounds and retains the bill in the recess of the connecting portion 3. When it is desired to release the bill, the collar 9 is forced outwardly over the convex sides of the stringer engaging loop, which are thus forced toward each other by the adjacent surfaces of the retaining collar, and yield sufficiently, when the collar is pushed outwardly, to permit the collar to move to the position illustrated in Figs. 5 and 7. When the retaining collar is in this position, the bill 5 can be moved crosswise of the connecting portion, to withdraw it from the recess in the connecting portion, and then swung away from the connecting portion to permit placing a fish on the loop 1.

In order to facilitate moving the retaining collar 9 and to overcome the slight resistance offered by the convex sides 4 and the frictional engagement with the connecting portion 3, one end of the collar 9 is preferably constructed to provide a flange 10 which may be of circular formation and extends outwardly from the collar 9 entirely around the same, affording a finger engaging portion which can be readily grasped, and permits sufficient tension to pull the retaining collar 9 outwardly from the connecting portion 3 and over the stringer engaging loop, to the position illustrated in Figs. 5 and 7.

It is preferable to employ the device with a stringer consisting of a nylon rope 11, which also is unaffected by water, and which cooperates with the retaining collar 9 in such a manner as to hold the device at any desired position on the stringer. It will be understood that in utilizing a stringer, a number of fish holders are employed, the stringer 11 being passed through the stringer engaging loops of the various holders successively with suitable spacing devices, not shown, between adjacent fish holders, and one end of the stringer is attached to the boat or dock, while the other end is provided with a suitable stop to retain the fish holders on the stringer. The lower end of the stringer with the fish thereon is suspended in water, and it is desirable to retain the unused or empty fish holders, or the one to be next employed in attaching a fish, at a convenient point on the stringer, and this is accomplished in the present structure by moving the retaining collar 9 to its outermost position where it grips the stringer or nylon rope 11 and holds the latter tightly between the retaining collar 9 and the outer end 12 of the stringer engaging loop as shown in Figs. 5 and 7.

When the parts are in this position with the retaining collar engaged with the nylon stringer, the bill is moved crosswise of the connecting portion 3 to release it from the recess 6, and when thus released, can assume a position as shown in dotted lines in Fig. 1, in readiness to receive a fish.

When a fish is to be attached to the holder, the bill 5 is flexed away from the connecting portion 3 sufficiently to insert the bill through the mouth of the fish, after which the bill is returned to a position over the recess or opening 6, and then moved crosswise into the recess where it is securely retained against endwise movement by the interlocking of the teeth or projections 7 with the interlocking pockets 8 of the connecting portion. While holding the bill in the recess 6, the retaining collar 9 is then moved endwise of the stringer engaging loop and endwise of the connecting portion until it assumes the position over the bill as shown in Figs. 1 and 2, and is retained in such position by the expanding convex sides 4 of the stringer engaging loop.

The retaining collar thus locks the bill securely in the connecting portion 3 where it is held positively against either endwise or crosswise movement. When thus held by the retaining collar 9, there is no possibility of the bill becoming accidentally released and it is impossible for a fish held on the loop 1 to release the bill by any amount of pressure or tension exerted upon any portion of the loop, or to release the bill in any way except by first forcing the retaining collar 9 endwise of the connecting portion with sufficient pressure to overcome its frictional engagement with the connecting portion and to force the convex sides 4 of the stringer engaging loop toward each other sufficiently to permit the retaining collar to move thereover.

So far as known, the only rustproof and waterproof material having the required characteristics of resiliency and wear for the purpose is nylon, although the invention may be carried out with some other material having similar characteristics and qualities, and while the invention has been described in relation to the particular structure shown, it is not confined to the details herein disclosed, and this application is intended to cover such modifications or departures as may come within the purposes of the improvement or the scope of the following claims.

I claim:

1. A rust-proof fish holder for stringers consisting of a nylon body comprising a fish engaging loop, a stringer engaging loop, a connecting portion between said loops integral with said stringer engaging loop and with one end of the fish engaging loop, said fish engaging loop having a bill at one end separable from said connecting portion, the connecting portion having a recess in one surface conforming to the shape of the bill and the bill having interlocking engagement with said recess in said connecting portion and said connecting portion acting to maintain the bill against endwise movement, and a nylon retaining collar surrounding and movable endwise of the connecting portion and acting when in one position to maintain the bill against movement crosswise of the connecting portion and when in another position acting to release the bill for movement away from the connecting portion.

2. A rust-proof fish holder for stringers consisting of a nylon body comprising a fish engaging loop, a stringer engaging loop, a connecting portion between said loops integral with said stringer engaging loop and with one end of said fish engaging loop, said fish engaging loop having a pointed bill at one end separable from the connecting portion, said connecting portion having an opening to receive the bill, the opening and bill having interlocking surfaces acting when engaged to prevent endwise movement of the bill, and a retaining collar surrounding and movable endwise of the connecting portion and stringer engaging loop, the collar having frictional engagement with the connecting portion and stringer engaging loop and acting when in one position to maintain the bill against movement crosswise of the connecting portion and when in another position to grip the stringer and maintain the holder against movement on a stringer extending through the stringer loop.

3. A rust-proof fish holder for stringers consisting of a nylon body comprising a fish engaging loop, a stringer engaging loop composed of outwardly convex opposite sides, a connecting portion between said loops integral with said stringer engaging loop and with one end of said fish engaging loop, said fish engaging loop having a bill at one end separable from the connecting portion, the connecting portion having a recess in one surface which receives said bill, the recess and bill having interlocking surfaces on adjacent edges acting when engaged to prevent endwise movement of the bill, the bill when positioned in said recess lying flush with the outer adjacent surfaces of the connecting portion, and a retaining collar surrounding and movable endwise of the connecting portion and stringer engaging loop, said collar having an interior cross-section corresponding to and fitting snugly around said connecting portion and of less width than said stringer engaging loop, the opposite sides of the stringer engaging loop being yieldably movable toward each other when the collar is moved endwise thereover.

4. A rust-proof fish holder for stringers consisting of a nylon body comprising a fish engaging loop, a stringer engaging loop having outwardly convex opposite sides, a connecting portion between said loops integral with said stringer engaging loop and with one end of the said fish engaging loop, said fish engaging loop having a bill at one end separable from said connecting portion, the connecting portion having a recess in one surface to receive the bill, the recess and bill having interlocking surfaces on adjacent edges acting when engaged to prevent endwise movement of the bill relative to the connecting portion, and a retaining collar surrounding and movable endwise of the connecting portion and stringer engaging loop, said connecting portion having a rectangular cross section and the collar having an interior rectangular cross section which fits snugly the connecting portion in frictional engagement therewith, the interior opening of the collar being of slightly less width than the normal width of the stringer engaging loop and held yieldably in its innermost position on the connecting portion by the opposite convex sides of the stringer engaging loop.

5. A rust-proof fish holder for stringers consisting of a nylon body comprising a fish engaging loop, a stringer engaging loop, a connecting portion between said loops integral with said stringer engaging loop and with one end of said fish engaging loop, said fish engaging loop having a pointed bill at one end separable from said connecting portion, the connecting portion having a recess in one face thereof which conforms to and receives the bill, interengaging means between the bill and connecting portion acting to prevent endwise movement of the bill, and a retaining collar surrounding and movable endwise of the connecting portion and when in one position overlying the end of the bill.

6. A rust-proof fish holder for stringers consisting of a nylon body comprising a fish engaging loop, a stringer engaging loop composed of outwardly convex opposite sides, a connecting portion between said loops integral with said stringer engaging loop and with one end of said fish engaging loop, the connecting portion having a rectangular cross-section, said fish engaging loop having a pointed bill at one end separable from the connecting portion and the connecting portion having a recess in one surface which conforms to and receives the bill, the recess and bill having interlocking surfaces on adjacent edges acting when engaged to prevent endwise movement of the bill, the bill when in said recess lying flush with the adjacent outer surfaces of the connecting portion, and a retaining collar surrounding and movable endwise of the connecting portion and stringer engaging loop, said collar having a rectangular outer cross-section and a rectangular inner cross-section that fits snugly around the connecting portion and frictionally engages the same, the interior cross-section of the collar being slightly less than the normal width of the stringer engaging loop and said opposite convex sides being yieldably movable toward each other when the collar is moved over the stringer engaging loop, and a finger engaging flange at one end of the collar extending outwardly around the collar.

References Cited in the file of this patent

UNITED STATES PATENTS

| 649,515 | Grozinger | May 15, 1900 |
| 1,182,471 | Frost | May 9, 1916 |
| 1,713,779 | Overton | May 21, 1929 |
| 2,264,883 | Lent | Dec. 2, 1941 |
| 2,482,386 | Vaisey et al. | Sept. 20, 1949 |
| 2,613,422 | Boden et al. | Oct. 14, 1952 |